(12) United States Patent
Okawa et al.

(10) Patent No.: US 7,683,984 B2
(45) Date of Patent: Mar. 23, 2010

(54) LIQUID CRYSTAL DISPLAY APPARATUS

(75) Inventors: Yoshiro Okawa, Kagoshima (JP);
Toshihiko Orii, Kanagawa (JP); Osamu Akimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 312 days.

(21) Appl. No.: 10/599,773

(22) PCT Filed: Apr. 14, 2005

(86) PCT No.: PCT/JP2005/007245
§ 371 (c)(1),
(2), (4) Date: Oct. 9, 2006

(87) PCT Pub. No.: WO2005/101110
PCT Pub. Date: Oct. 27, 2005

(65) Prior Publication Data
US 2007/0200965 A1    Aug. 30, 2007

(30) Foreign Application Priority Data
Apr. 16, 2004   (JP) ............................ P2004-121741

(51) Int. Cl.
*G02F 1/1333* (2006.01)
(52) U.S. Cl. ......................... 349/110; 349/56
(58) Field of Classification Search ............. None
See application file for complete search history.

(56) References Cited

U.S. PATENT DOCUMENTS

2002/0145695 A1 * 10/2002 Kim et al. ................... 349/141
2006/0001805 A1 * 1/2006 Yang et al. .................. 349/114

FOREIGN PATENT DOCUMENTS

| JP | 63-097919 | 4/1988 |
|----|-----------|--------|
| JP | 64-024232 | 1/1989 |
| JP | 5-127195 | 5/1993 |
| JP | 10-325961 | 12/1998 |
| JP | 2001-249326 | 9/2001 |

OTHER PUBLICATIONS

International Search Report dated May 24, 2005.

* cited by examiner

*Primary Examiner*—Tina M Wong
(74) *Attorney, Agent, or Firm*—Sonnenschehin Nath & Rosenthal LLP (57) ABSTRACT

A liquid crystal display in which image quality is enhanced by reducing coupling noise with adjacent wiring or element and noise entering therefrom, and redundancy is imparted even when short circuit of wiring takes place in a pixel and a defect can be treated as if it is not a defect. Display pixels are provided, respectively, at the intersections of a plurality of vertical signal lines (15) and a plurality of horizontal signal lines (17), each of the vertical signal lines (15) and the horizontal signal lines (17) is provided with a shield wire (3) and the potential of the shield wire (3) is set at such a level as to display the display pixel in black.

4 Claims, 6 Drawing Sheets

LIQUID CRYSTAL DISPLAY APPARATUS

TECHNICAL FIELD

The present invention relates to a liquid crystal display apparatus.

BACKGROUND ART

Figure 6:
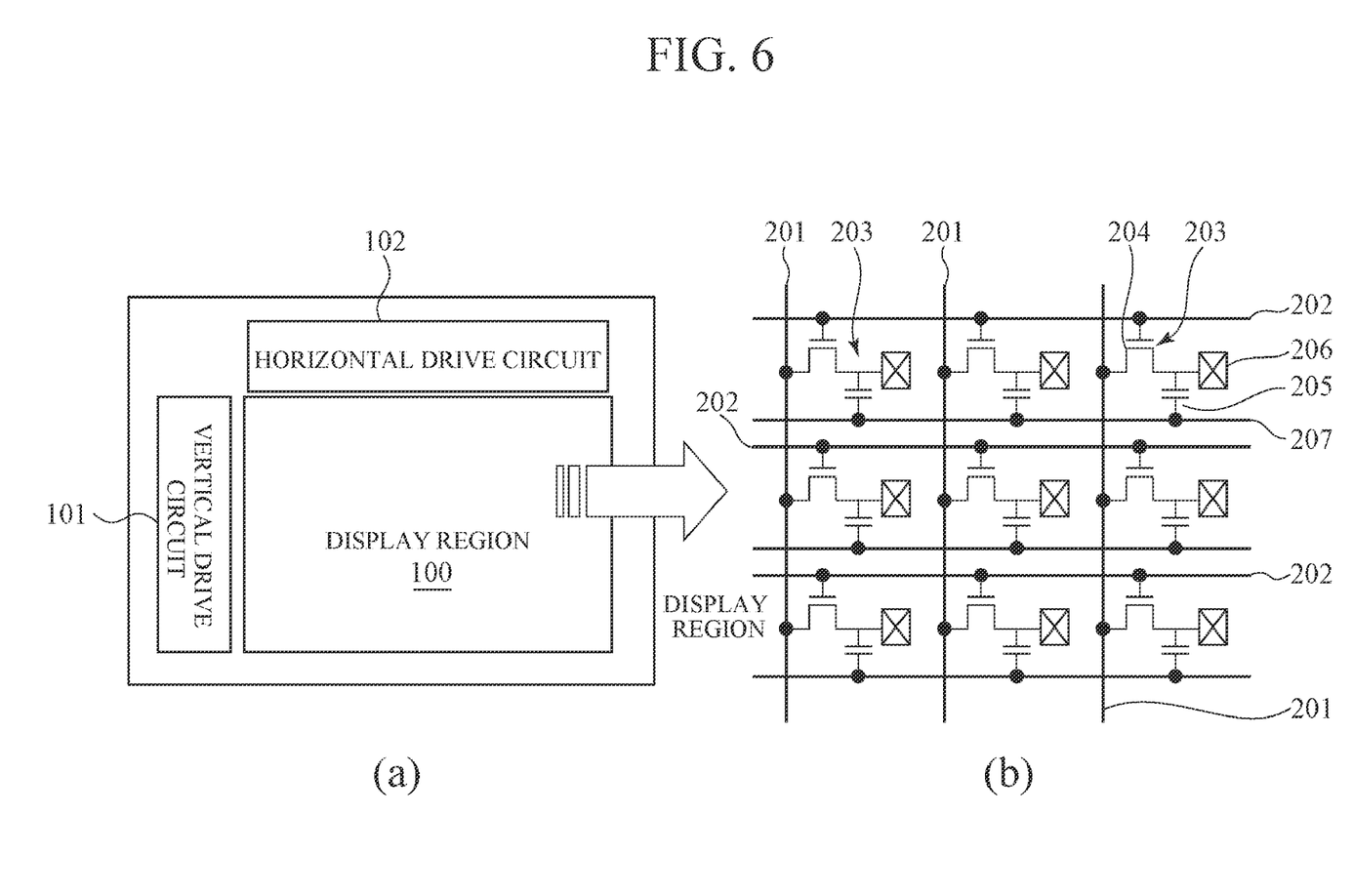
FIG. 6 is a diagram showing a conventional liquid crystal display.

A conventional liquid crystal display is constructed generally to have a vertical drive circuit 101 and a horizontal drive circuit 102 disposed outside a display region 100 as shown in FIG. 6 (*a*).

As shown in FIG. 6(*b*), in the above-mentioned display region 100, display pixels 203 are provided, respectively, at intersections of a plurality of vertical signal lines 201 and a plurality of horizontal signal lines 202. The above-mentioned vertical signal lines 201 are connected to the above-mentioned vertical drive circuit 101, on the other hand, the horizontal signal lines 202 are connected to the above-mentioned horizontal drive circuit 102 via a video signal input line which is not shown. The above-mentioned display pixel is composed of a thin film transistor (for example, TFT: Thin Film Transistor) 204, a capacitor 205 and a pixel electrode 206. Numeral 207 denotes a capacitor line.

Assuming that, as a color liquid crystal display (hereinafter referred to simply as a liquid crystal display), there are such one configured to be capable of displaying colors by adding color filters made of resin containing paints or pigments having three primary colors of RGB to the above-mentioned liquid crystal display, or a projector or a projection television which uses three panels of liquid crystal displays without color filters and enables color display by inputting RGB lights and signals respectively thereto and composing an image therefrom, and further, a projector or a projection television which uses only one liquid crystal display panel likewise without color filters and enables color display by controlling the lights and signals to be inputted to the panel. Along with the proliferation of digital equipment represented typically by personal computers, demands for this color liquid crystal display are becoming versatile, and needs for enhanced image quality such as higher resolution and high fidelity color reproduction are increasing.

Therefore, also in the markets of projectors and projection televisions where transmission type liquid crystal displays have been dominant until now, demands for a reflective type liquid crystal display which has a capability for further improvement in the display image quality are increasing.

A reflective type liquid crystal display is more advantageous in that the following approaches can be achieved more easily than the transmission type liquid crystal display. (1) downsizing by decreasing a pixel area (a minimum display unit), (2) pixel multiplication without downsizing, and (3) to increase image smoothness by reducing a lattice-like black display area between pixels which is unavoidable due to the structure of the liquid crystal display.

However, if the pixel multiplication or the downsizing of the pixel area is carried out, there easily occurs rounding of a signal waveform due to fluctuation of a quantity of wiring coupling, or a noise from adjacent signal wiring, thereby introducing a risk of degrading the display image quality.

Therefore, there has been proposed a method for improving the image display quality by providing a grounded shield wire to a part or to the whole of the vertical signal lines and the horizontal signal lines so as to reduce a coupling noise with adjacent wiring or elements, and a noise entering therefrom (for example, refer to a patent document 1).

Patent Document 1: Japanese Patent Application Publication No. H06-11684.

That is, because the potential of the shield wire is constant, it is considered that a stable driving free of noise from external or the like becomes possible, thereby enhancing image quality.

However, as described in the above patent document 1 above, in such a structure in which the grounded shield wire is provided to part or the whole of the vertical signal lines and the horizontal signal lines, a wiring occupying density increases, and there is a risk that a defect such as a short circuit of wiring or the like takes place in each pixel.

Therefore, although certainly the image quality will improve, there is a risk that a product yield will decrease.

For example, if it is a memory such as DRAM or the like, a so-called redundancy remedy circuit is provided having a reserve block provided in advance to be switchable with a block having a defect by use of a fuse or the like, however, in the liquid crystal display, although the blocks are switched, this is not applicable as a color liquid crystal display in which the pixels and the color filters are disposed corresponding therebetween.

DISCLOSURE OF THE INVENTION

Therefore, an object of the present invention is to provide a liquid crystal display apparatus capable of solving the above-mentioned problems. There is provided a liquid crystal display apparatus in which display pixels are disposed, respectively, at the intersections of a plurality of vertical signal lines and a plurality of horizontal signal lines, shield wires are provided to the above-mentioned vertical signal lines and horizontal signal lines, respectively, and the potential of the above-mentioned shield wires is set at a value at such a level as to display the above-mentioned display pixel in black.

That is, the liquid crystal display apparatus is provided, which is characterized by comprising display pixels disposed, respectively, at the intersections of the plurality of vertical signal lines and the plurality of horizontal signal lines, and the shielding wires provided respectively to the above-mentioned vertical signal lines and horizontal signal lines, and is characterized in that the potential of the above-mentioned shield wires is set at a value at such a level as to display the above-mentioned display pixels in black.

Further, it is also characterized in that, in a normally black mode, the potential of the above-mentioned shield wires is set at the same value or an approximate value as the potential of a common electrode.

Still further, it is also characterized in that, in a normally white mode, the potential of the above-mentioned shield wires is set at a maximum value, a minimum value or a value approximate thereto to be applied to the display pixel.

BEST MODE FOR CARRYING OUT THE INVENTION

The present invention relates to a liquid crystal display apparatus, which is characterized in that display pixels are disposed respectively at interactions of a plurality of vertical signal lines and a plurality of horizontal signal lines, and shield wires are provided to the above-mentioned vertical signal lines and horizontal signal lines, respectively, and further, a potential of the above-mentioned shield wires is set at a value at which the above-mentioned display pixels are displayed in black.

Namely, the liquid crystal display apparatus includes the display pixels disposed at the intersections of the plurality of vertical signal lines and the plurality of horizontal signal lines, and the shield wires provided to the above-mentioned vertical signal lines and horizontal signal lines, respectively, and the potential of the above-mentioned shield wires is set at a value at which the above-mentioned display pixels are displayed in black.

At this time, in the normally black mode, the potential of the above-mentioned shield wire is preferably set at the same value or an approximate value as the potential of a common electrode. On the other hand, in the normally white mode, the potential of the above-mentioned shield wire is preferably set at a maximum value, a minimum value of voltage or at a value approximate thereto to be applied to the display pixel.

That is, while enabling to realize a pixel multiplication and downsizing of a pixel area by providing the shield wires to the above-mentioned vertical signal lines and horizontal signal lines, respectively, and preventing the distorting of a signal waveform due to fluctuations of a wiring coupling quantity as well as the occurrence of a noise from adjacent signal lines, thereby enhancing the image quality, and still it becomes possible to impart redundancy against a defect such as a short circuit of wiring resulting from an increased wiring occupation density due to the provision of the shield wires.

The basis for redundancy in the liquid crystal display apparatus resides in "how it reflects on the eyes of a person" as a defective. Therefore, in the liquid crystal display, "a defect which cannot be recognized by the eyes of a person can be treated as non-defective".

Therefore, considering a defective (defect) having redundancy, in a case of the color liquid crystal display apparatus, if only one color in an image having mixed colors of RGB (three primary colors of red, green and blue) is displayed in black, it is very difficult for the human eyes to discriminate it. Therefore, even if a short circuit occurs between the pixel and the shield wire, if the potential of the shield wire is set so as to display the display pixel in black, the defect of the short circuit of wiring cannot be caught as a defect by the human eyes, consequently appearing nothing less than a non-defective product.

For driving the liquid crystal, AC drive is used which gives a rectangular signal relative to the potential of a common electrode to each pixel. Further, in the liquid crystal display apparatus, there are two modes of a normally white or a normally black divided depending on whether the state of display in which no voltage is applied to the pixel is white or black.

Thus, if the potential of each shield wire is set in a range of potentials allowing for the display pixel to be displayed nearly in black, even if a short circuit of the pixel and the shield wire takes place, it cannot be discriminated on appearance by the human eyes, and thus can be handled as a non-defective product.

By the way, as to the range of potentials allowing the nearly black display, it is because that for the liquid crystal display apparatus it is not always necessary to have a completely black state, and because of the characteristics of the liquid crystal having a threshold value for a voltage, the potential may be allowed to have a certain degree of width.

That is, in the case of the normally black, it is not necessarily required to be the same as the potential of the common electrode. On the other hand, in the case of the normally white, it is not always necessary to set the potential at the maximum value or the minimum value of voltage to be applied to the vertical signal line, and thus it may be set in a range of potentials allowing the display nearly in black. If the occasion permits, it may be grounded.

Still further, in the liquid crystal display apparatus according to an embodiment of the present invention, no dedicated power supply is required for the shield wires, and other power supplies in use within the liquid crystal display may be used therefor, thereby eliminating a risk of cost increase.

Embodiment

Figure 1:
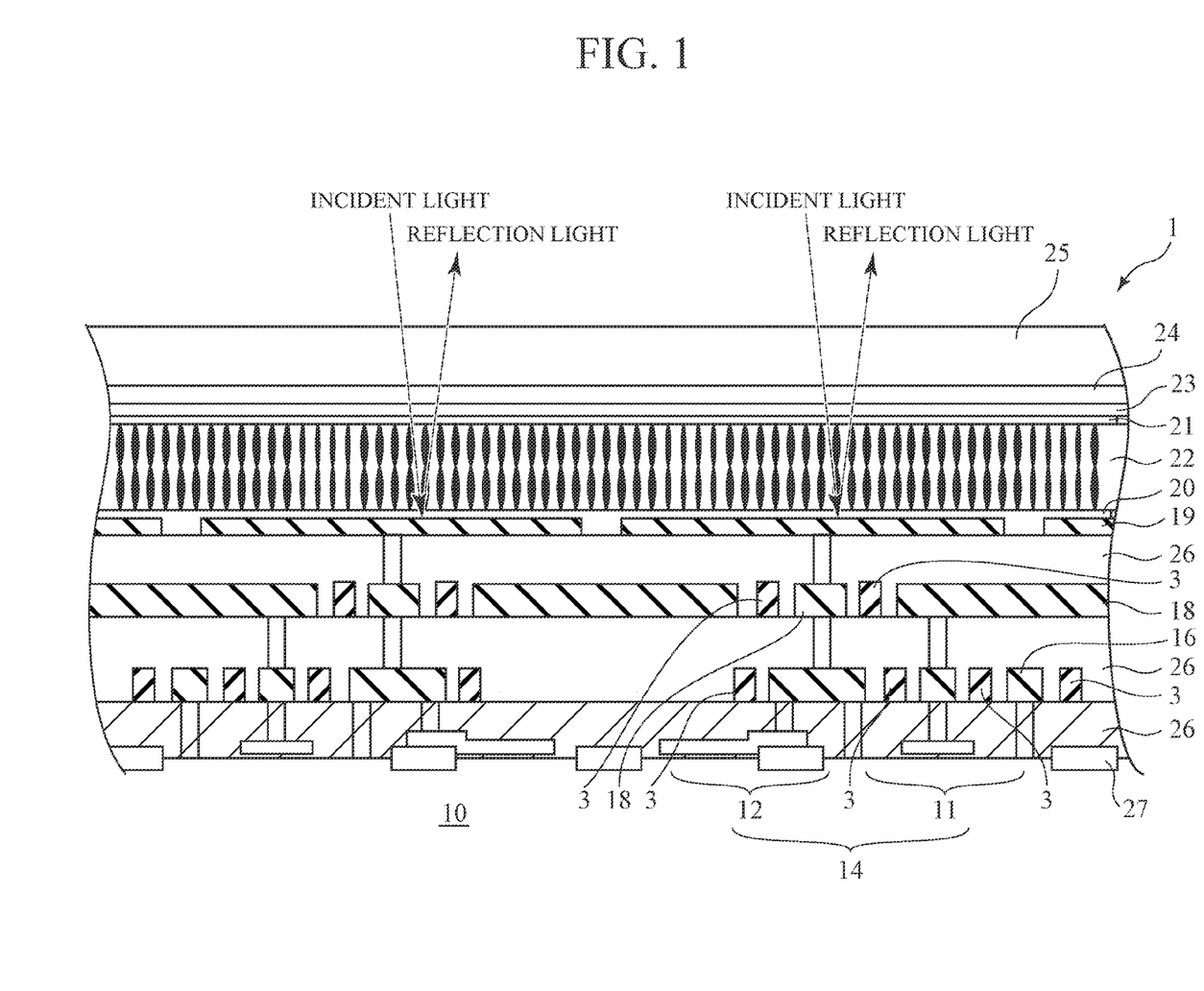
FIG. 1 is a diagram showing a cross-sectional view of a liquid crystal display according to an embodiment of the present invention.
Figure 2:
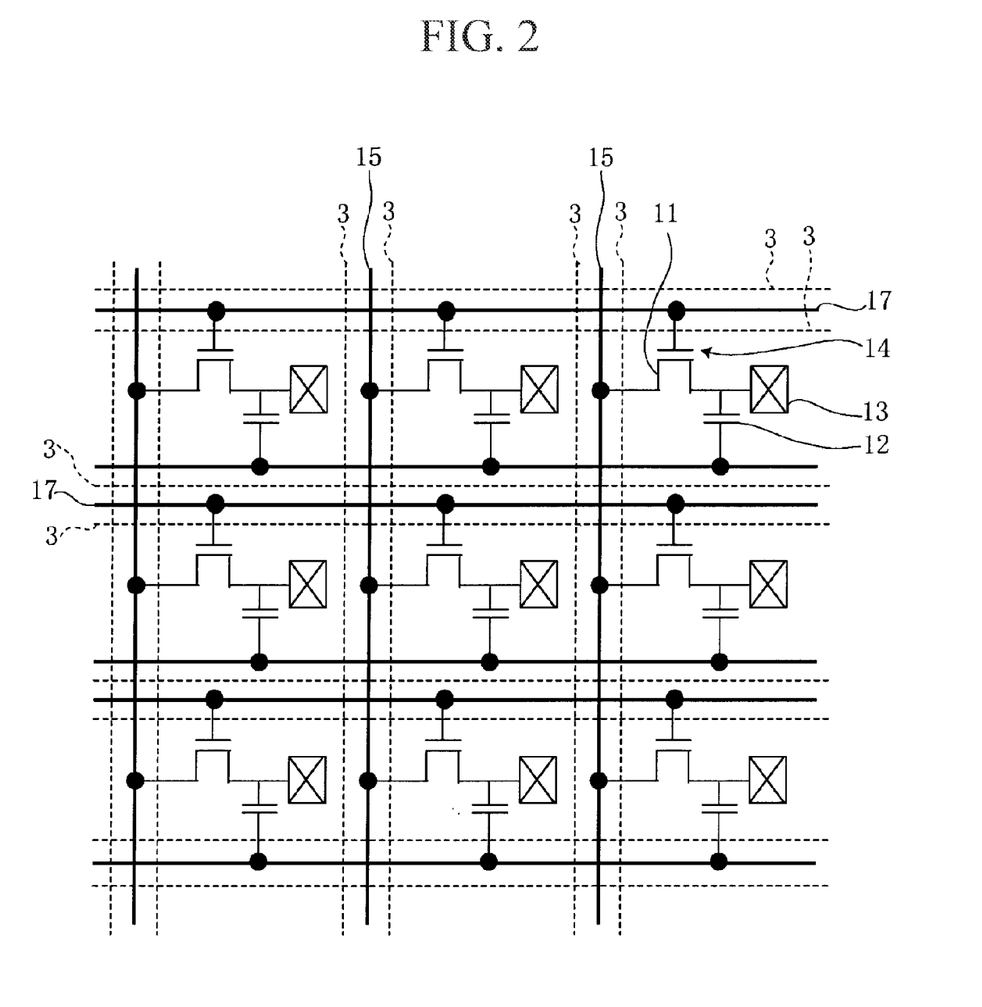
FIG. 2 is a diagram showing a plan view of a display region of the liquid crystal display.

In the following, a preferred embodiment of the present invention will be described by referring to the accompanying drawings. The present invention is suitably applicable, in particular, to a color liquid crystal display apparatus, therefore in the following description, it will be described as a color liquid crystal display apparatus. FIG. 1 is a diagram showing a cross-sectional view of a color crystal display apparatus according to an embodiment of the present invention, and FIG. 2 is a diagram showing a plan view of a display region of the color liquid crystal display apparatus according to the same.

As shown in FIG. 1, in the color liquid crystal display apparatus 1 according to the embodiment of the present invention (hereinafter referred to as the liquid crystal display apparatus), a display pixel 14 including a transistor 11, a capacitor 12 and a pixel electrode 13 is formed on a silicon substrate (Si substrate) 10, a first metal layer 16 for use of a vertical signal line 15 (refer to FIG. 2) to serve as an image signal line is formed thereon, a second metal layer 18 for use of a horizontal signal line 17 (FIG. 2) to serve as a gate (control signal) wiring is formed on the first metal layer 16, and on this second metal layer 18, a third metal layer 19 is formed as a light reflection plate.

Further, on this third metal layer 19 there are formed a substrate side alignment film 20 and a counter side alignment film 21 for aligning orientations of the liquid crystal. In a gap between the substrate side alignment film 20 and the counter side alignment film 21, a liquid crystal 22 is sandwiched.

Still further, on the above-mentioned counter side alignment film 21, a color filter 23 is formed, and wholly thereon a transparent electrode 24, for example, of an ITO (Indium and Titan Oxide) film is formed, and still further thereon a glass substrate 25 is provided.

In FIG. 1, a reference numeral 26 denotes a layer insulation film, and 27 denotes an element isolation region such as LOCOS (Local Oxidation of Silicon) and the like.

It is noted that, in the case of the present embodiment, although it is described that the color filter is formed, the color filter may not be necessarily required as already referred to in the description of the Background Art. Still further, although it is described hereinabove that the color filter is provided on the counter side, the color filter may be provided, for example, on the third metal layer 19 as well.

The above-mentioned color filter 23 is formed, for example, by adding a luminescent substance such as a luminescent paint, pigment or the like to gelatin, resin, a photo-resist solution or the like. Further, this color filter 23 is such one that transmits a light in a specific range of wavelengths, namely, that transmits the light in a specific range of wavelengths required and absorbs light in other ranges of wavelengths. For example, a red color filter 23 transmits a light in the range of wavelengths of red color, and absorbs light in the range of wavelengths other than that. Then, in order to achieve a full color display, as the above-mentioned color filter 23, three kinds of red, green and blue colors are used, which are disposed flatly in a mosaic, triangle or stripe pattern, then, the display pixels 14 are formed for each color, and each light having transmitted each display pixel 14 is synthesized.

Namely, by arranging such that a light having transmitted the color filter 23 is reflected on the third metal layer 19 serving as the light reflector disposed in the backward, and passes through the color filter 23 again to be picked up as an output light on the incident side, this output light is able to display an image having a desired color tone due to synthesis of lights by the respective display pixels 14.

Still further, in this embodiment of the invention, in addition to the above-described fundamental structure, a shield wire 3 is provided to the vertical signal line 15 and the horizontal signal line 17, respectively.

Namely, the shield wires 3 are disposed on both sides of the above-mentioned vertical signal line 15 and on both sides of the above-mentioned horizontal signal line 16 so as to sandwich the above-mentioned vertical signal line 15 and horizontal signal line 16 therebetween, respectively.

This is shown in FIG. 2 in a plan view. Namely, a plurality of display pixels 14 are disposed in a matrix pattern and respective display pixels 14 are provided at intersections of the plurality of vertical signal lines 15 and the plurality of horizontal signal lines 17. And, a plurality of shield wires 3 are provided so as to sandwich the above-mentioned vertical signal lines 15 and horizontal signal lines 17, respectively.

This shield wire 3 is disposed for reducing a coupling noise with adjacent wiring or element and a noise entering therefrom, thereby, by enabling to prevent the rounding of a signal waveform due to the above-mentioned noise, it becomes possible to improve display image quality in the liquid crystal display apparatus 1.

It is noted that, in this embodiment of the invention, although the shield wires 3 are depicted to surround each display pixel 14 squarely in the plan view (refer to FIG. 2), it may be sufficient if at least one or more thereof is disposed for a display pixel 14. Further, as shown in FIG. 1, the first metal layer 16 is used for the vertical signal line 15 and the second metal layer 18 is used for the horizontal signal line 17, however, this arrangement is not to limit the object of use of the wire. The object of uses may be reversed, or it may be arranged such that the horizontal signal line 17 is formed simultaneously, for example, with a gate electrode of the transistor 11 or the like. Further, although the transistor 11 and the capacitor 12 are formed on the same substrate, the capacitor 12 may be formed within the metal wiring or may be laminated on the transistor 11, for example.

In the liquid crystal display 1 having the structure described above, the feature of this exemplary embodiment resides in that each potential of the above-mentioned shield wires 3 is set at a potential at which each display pixel is allowed to be displayed in black or nearly in black.

Figure 3:
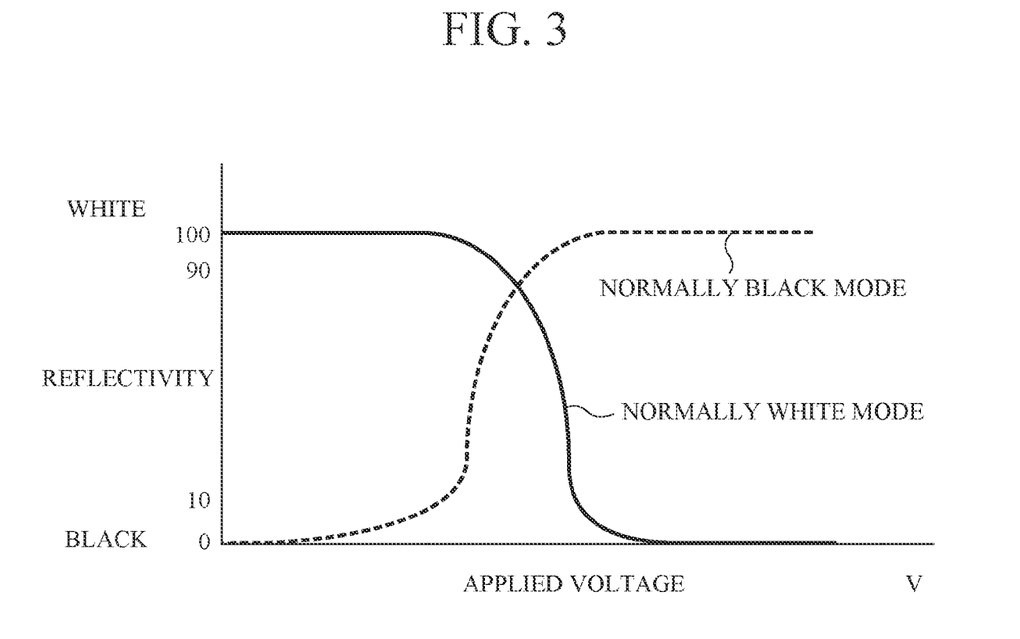
FIG. 3 is a diagram showing a relationship between voltages applied to the pixel and the black display of the pixel.

The reason to have the potential, not limiting to the value of black display, to be at such a value for allowing nearly black display, is because that since the liquid crystal has intrinsically a threshold value with respect to a voltage, the potential of the shield wire 3 may have a certain degree of widths. For example, in case where a liquid crystal that is driven by ±5V is used, there is almost no problem for the potential to be approximately ±2.5V of the voltage for displaying in black. It is noted that, in the drawing, solid lines denote a normally white mode to be described later, and broken lines denote a normally black mode.

Figure 4:
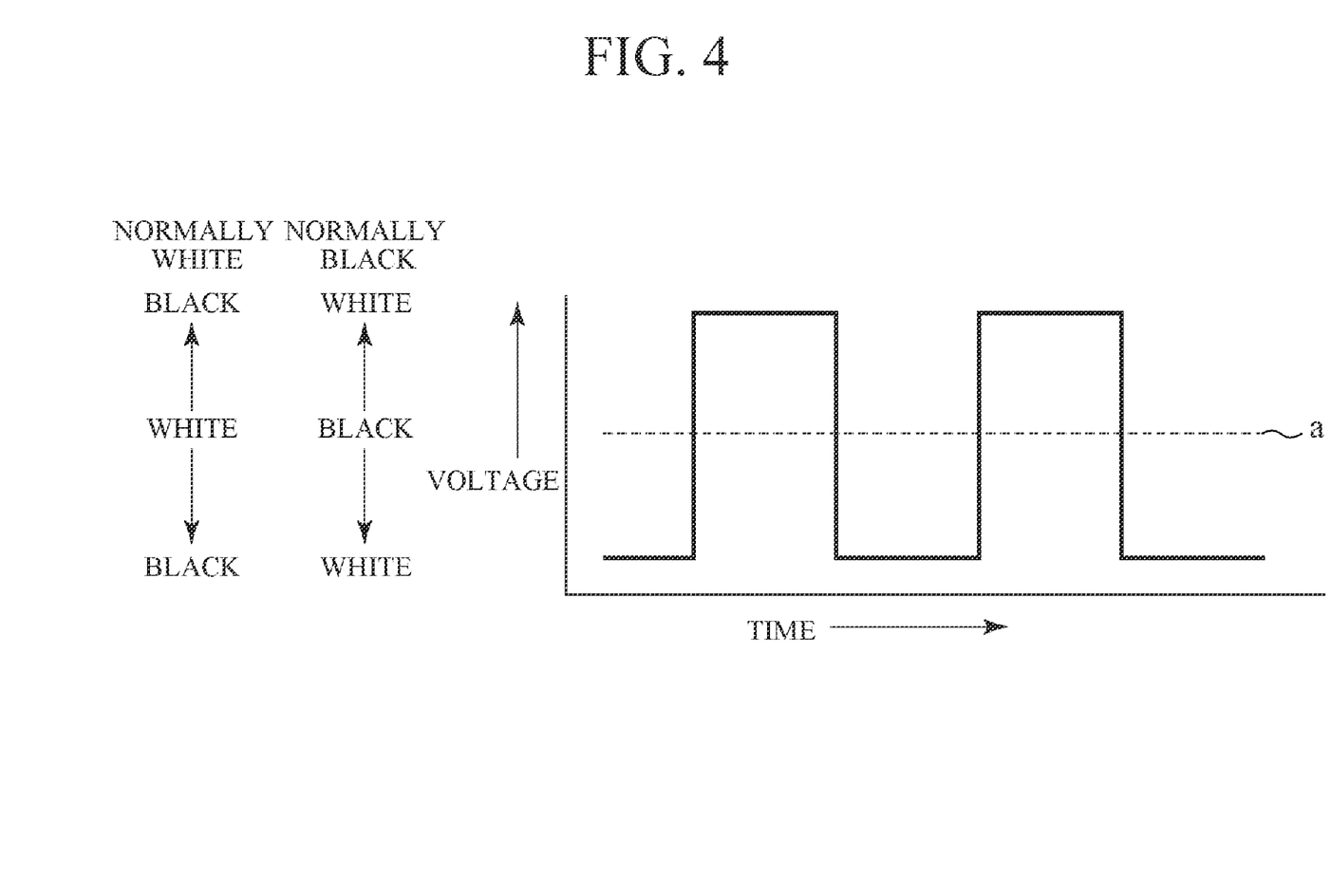
FIG. 4 is a diagram showing a voltage to be applied to the pixel for AC driving.

To drive the liquid crystal, as shown in FIG. 4, AC drive is used whereby a rectangular wave signal relative to the potential of the transparent electrode 24 is supplied per pixel. There are two modes of the above-mentioned normally white mode or normally black mode divided depending on whether the state of display in which no voltage is applied to the pixel is white or black. It is noted that, in FIG. 4, the voltage to be applied to each display pixel does not take a constant value at a top and a bottom due to the influence of coupling or the like, therefore, a potential (a) of the transparent electrode 24 does not take a center position between the applied voltages of top and bottom. However, for simplicity of description, the potential (a) of the transparent electrode 24 is shown at the center position.

Therefore, as a specific potential of the shield wire 3 in the embodiment of the invention, if in the case of the normally black mode, it is set at the same value as the potential (a) of the transparent electrode 24 or at an approximate value thereto.

On the other hand, in the case of the normally white mode, the potential of the shield wire 3 is set at a maximum value, a minimum value or at a value approximate thereto of the voltage to be applied to the display pixel 14.

By differently setting the potential of the shield wire 3 between the normally black mode and the normally white mode in this way, even if a short circuit of wiring takes place in the display pixel 14, it is able constantly to display in black, thereby rendering a display defect due to the short circuit of wiring to be indistinguishable to the human eyes That is, when considering a defect having redundancy, in an image mixed with RGB (three primary colors of Red/Green/Blue), if only one pixel is displayed in black in the image, it is very difficult for the human eyes to discriminate the black display.

Figure 5:
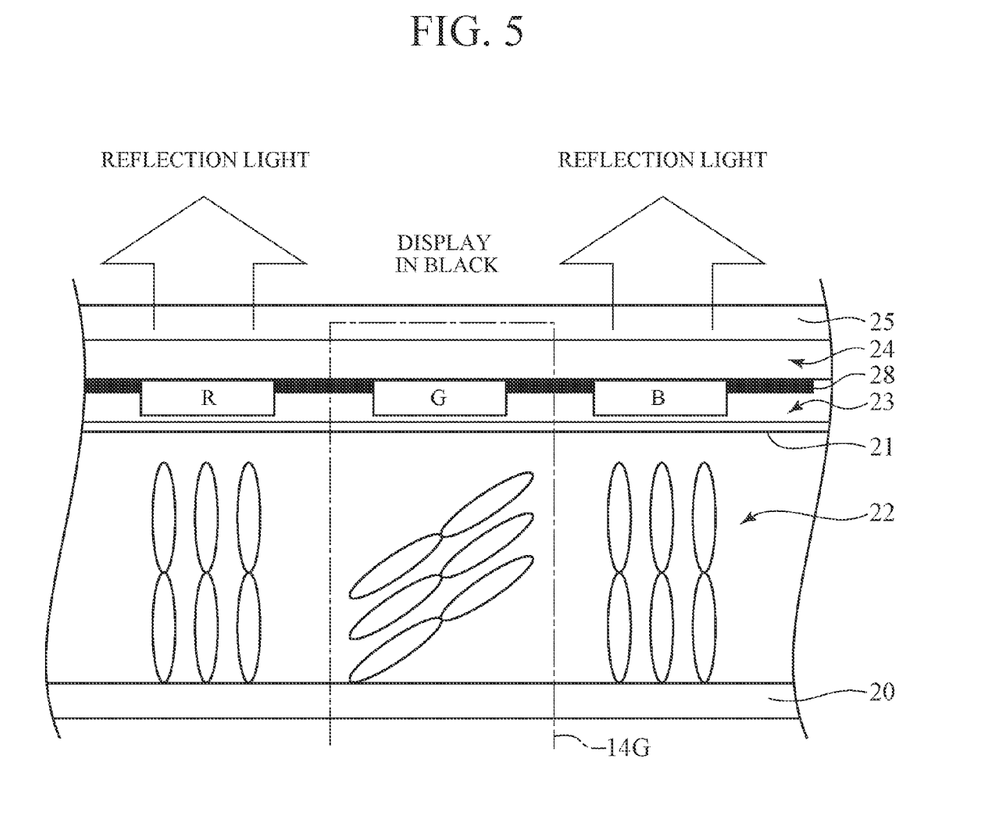
FIG. 5 is a diagram showing a state of the display pixel displayed in black.

Therefore, as shown in FIG. 5, in a case of displaying a predetermined image, if a defect occurs due to a short circuit of wiring, for example, in a display pixel 14G corresponding to green (G) in the color filter 23, provided that the potential of the shield wire 3 is set so as to display this display pixel 14G in black, the display pixel 14G will not display a green color but will display black. It is noted that, in FIG. 5, a reference numeral 28 denotes a light shielding film which is a so-called black matrix, and is disposed between respective display pixels 14.

As described hereinabove, in the image having mixed colors of RGB, it is difficult for the human eyes to discriminate the presence of a display pixel 14 having a defect, consequently allowing for the defect to be left unnoticed, thereby allowing this liquid crystal display apparatus 1 itself to be treated as a standard article.

As described heretofore, by arranging so that the potential of the shield wire 3 is assignable per unit pixel, and its potential is set at a potential at which each display pixel is displayed in black or at a potential approximate thereto allowing to be displayed nearly in black, even if there occurs a defect such as a short circuit of wiring in the display pixel 14, because this defect is not recognizable by the human eyes, it becomes possible to treat this as a non-defective product.

Therefore, according to the embodiment of the present invention, by the provision of the shield wire 3, image quality can be improved as the liquid crystal display apparatus 1, and also the noise can be reduced, thereby enabling to expand a possibility for further downsizing of elements, and realize enhancement of image quality by pixel-multiplication anticipated to be demanded from the market, and/or cost reduction for downsizing of a liquid crystal display panel will become possible.

Further, by the provision of the shield wire 3, since the wiring density increases, shielding of the transistors 11 against an incident light can be achieved simultaneously, thereby expanding an incident light margin.

In addition, as to the defect of short circuit anticipated by the increased density of wiring for the shield wire 3, because redundancy is imparted by setting the potential of the shield wire 3 at a potential at which each display pixel is displayed in black, or at a potential at which each display pixel is displayed nearly in black, thereby allowing for the defect to be treated as if a non-defective product, it becomes possible to prevent a decrease in the product yield. And still further, because no dedicated power supply is required for the shield wire 3, there is no risk of increasing the cost, thereby contributing to the cost reduction in total.

Furthermore, by suitably setting the potential of the shield wire 3 depending on the normally white mode and the normally black mode, it becomes possible to impart redundancy easily in whatever mode.

Although the present invention has been described by way of example of the embodiment and the examples according to the present invention described above, the present invention is not limited thereto.

That is, the present invention is characterized in that the display pixels 14 are provided mainly at the intersections of the plurality of vertical signal lines 15 and the plurality of horizontal signal lines 7, respectively, and the shield wires 3 are provided to the above-mentioned vertical signal lines 15 and horizontal signal lines 17, respectively, and further that the potential of the above-mentioned shield wire 3 is set at the value at which the above-mentioned display pixel 14 is displayed in black, wherein the kinds of the liquid crystal or the structure of the liquid crystal display apparatus 1 are not limited specifically. Further, the present invention is not limited to the analog drive as in the exemplary embodiment of the invention, and is applicable to any other drive methods such as a digital drive or the like.

INDUSTRIAL APPLICABILITY

According to the present invention, because that the display pixels are provided at the intersections of the plurality of vertical signal lines and the plurality of the horizontal signal lines, respectively, that the shield wires are provided to the above-mentioned vertical signal lines and horizontal signal lines, respectively, and that the potential of the above-mentioned shield wires 3 is set at the value so as to display the above-mentioned display pixels in black, even if there occurs the defect such as the short circuit of wiring, since this defect is not recognizable by the human eyes, the defect can be treated as if it is not a defect but is a non-defective product. Thereby, while enabling to enhance the image quality, it becomes also possible to prevent the decrease in the product yield.

Further, regardless whether it is the normally white mode or the normally black mode, redundancy can be imparted easily, and further, no dedicated power supply for the shield wire is needed, thereby allowing for any other power supply in use in the liquid crystal display to be used therefor.

The invention claimed is:

1. A liquid crystal display apparatus comprising:
a plurality of vertical signal lines;
a plurality of horizontal signal lines;
a display pixel located where one of the vertical signal lines and one of the horizontal signal lines intersect; and
shield wires on opposite sides of each of the vertical signal lines and on opposite sides of each of the horizontal signal lines,
wherein,
a potential of the shield wires is set at a value at which the display pixel is displayed in black, such that when a defect occurs it is not recognized by a human eye.

2. A liquid crystal display apparatus comprising:
a plurality of vertical signal lines;
a plurality of horizontal signal lines;
a display pixel located where one of the vertical signal lines and one of the horizontal signal lines intersect; and
shield wires on opposite sides of each of the vertical signal lines and on opposite sides of each of the horizontal signal lines,
wherein,
a potential of said shield wires is set at a value at which the display pixel is displayed in black or nearly black, such that when a defect occurs it is not recognized by a human eye.

3. A liquid crystal display apparatus as claimed in claim 1 or 2, wherein in a normally black mode, the potential of said shield wire is set at a value equal to or nearly equal to a potential of a common electrode.

4. A liquid crystal display apparatus as claimed in claim 1 or 2, wherein in a normally white mode, the potential of said shield wire is set at a maximum value, a minimum value or a value approximate thereto of a voltage to be applied to the display pixel.

* * * * *